Sept. 22, 1959   C. P. HOSTETLER ET AL   2,905,344
BIN DUMPING MECHANISM
Filed Oct. 29, 1958   2 Sheets-Sheet 1
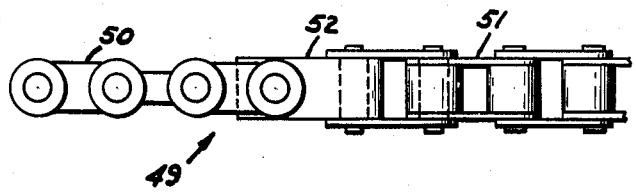
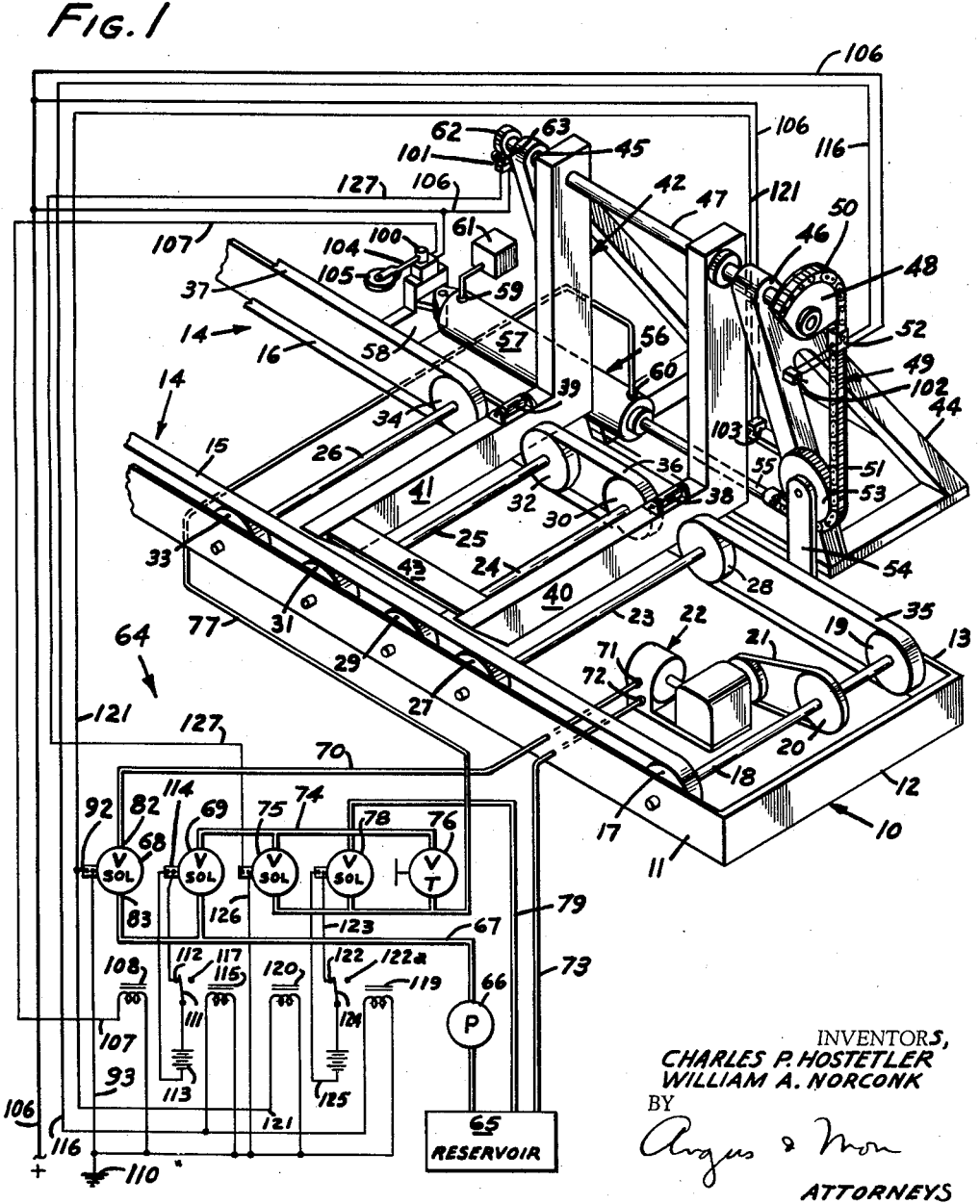
INVENTORS,
CHARLES P. HOSTETLER
WILLIAM A. NORCONK
BY
ATTORNEYS Sept. 22, 1959  C. P. HOSTETLER ET AL  2,905,344
BIN DUMPING MECHANISM
Filed Oct. 29, 1958  2 Sheets-Sheet 2
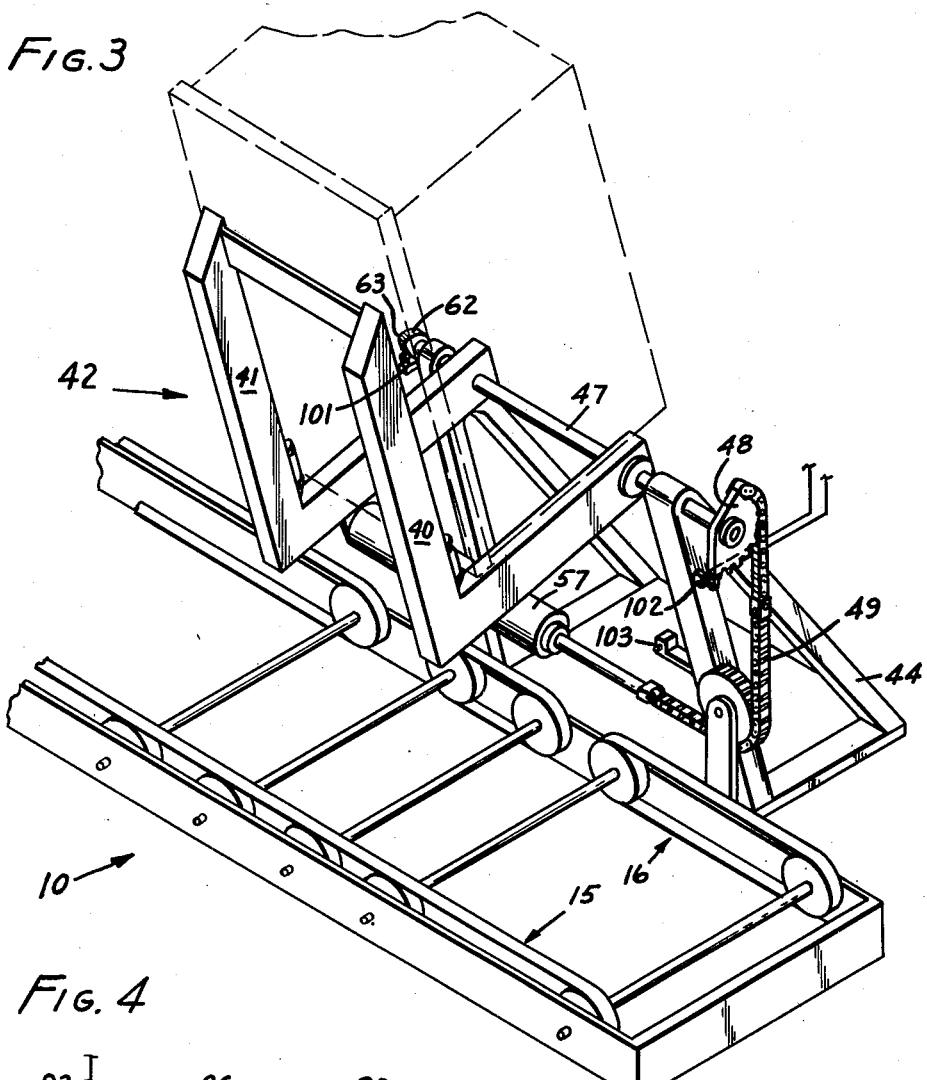
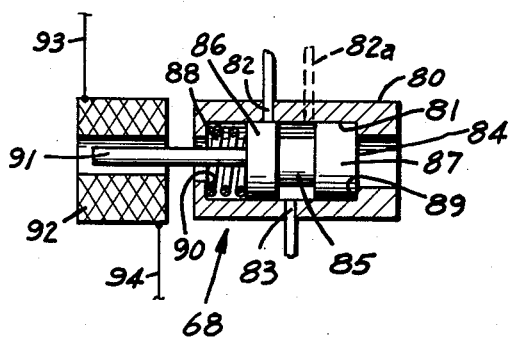
INVENTORS,
CHARLES P. HOSTETLER
WILLIAM A. NORCONK
BY
*Angus & Mon*
ATTORNEYS United States Patent Office 2,905,344
Patented Sept. 22, 1959

2,905,344

BIN DUMPING MECHANISM

Charles P. Hostetler and William A. Norconk, Redlands, Calif., assignors to Fruit Equipment Service, Redlands, Calif., a corporation of California Application October 29, 1958, Serial No. 770,546

7 Claims. (Cl. 214—314)

This invention relates to materials handling machinery, and in particular to a device for dumping bins.

Particularly in the processing of agricultural products, it is desirable to handle these products in large bins. Bin handling is quite advantageous, because the bins can conveniently be stacked and handled by fork-lift machinery. But heretofore, the unloading of such bins has been a troublesome and expensive process and there has been provided no convenient means for carrying it out. It is an object of this invention to provide automatic bin handling machinery which can handle and dump bins automatically and in rapid sequence.

Previous bin handling equipment has suffered from the disadvantage that the dumping of the bin was often dumped too fast, and this resulted in damage and spillage. The alternative has been to carry out the operation slowly, but this is also undesirable. It is an object of this invention to provide an automatic bin dumping machine which dumps the bin by tilting it at a rapid rate before the fruit starts to dump out, and at a slower rate thereafter, thereby providing a fast total cycle in which the fruit dumping is carried out in a manner which will not injure the fruit or overflow the production line, or require large surge bins.

This invention is carried out by providing a track adapted to move the bins horizontally, a lift which may conveniently be a fork device, motor means for operating the track, and motor means for operating the lift whereby the lift is adapted to raise and tilt the bin.

A feature of the invention resides in a control means for the aforesaid mechanism, wherein switching means are provided for sequentially starting and stopping the track when bins are properly positioned on the lift, and then operating the lift to dump the bin, then lowering the lift so as to return the bin to the track, thereafter shutting down the lift and again actuating the track means so as to remove the empty bin from the lift means and deposit a full bin thereon, after which the cycle is repeated.

According to a preferred but optional feature of this invention, means are provided in the actuation system for the motor that operates the lift so that the bin initially tilts a rapid angular rate and then, when the contents begin to flow from the bin, the rate of tilt decreases.

The above and other features of this invention will be fully understood from the following detailed description and the accompanying drawings, of which:

Fig. 1 is an isometric view, partly in schematic notation, showing a bin dumping apparatus according to the invention, along with a control circuit for controlling its operation;

Fig. 2 is a plan view of a portion of chain utilized in the apparatus of Fig. 1;

Fig. 3 is an isometric view of the structure of Fig. 1 shown in a different operational position; and Fig. 4 is a fragmentary view, partly in cutaway cross-section, showing a solenoid valve used in the device of Fig. 1.

A bin dumping machine according to the invention is shown in Fig. 1. This machine has a frame 10 which includes beams 11, 12 and 13 which are joined together to form a rigid support for the mechanism.

A conveyor track 14 has a pair of chain belts 15, 16. Chain belt 15, which is shown at the left-hand side of Fig. 1, winds over a sprocket 17 that is mounted on a drive shaft 18. Drive shaft 18 is journaled in beams 11 and 13 and has a second sprocket 19 adjacent to beam 13. A drive sprocket 20 is disposed between sprockets 17 and 19 and is driven by a chain drive 21 which is operated by a fluid motor 22.

Chain belt 15 is a continuous loop that passes over an idler sprocket (not shown) at the other end of the loop from drive shaft 18. Idler shafts 23, 24, 25 and 26 are journaled between beams 11 and 13. Shafts 23–26 have pinned thereto sprockets 27, 28, 29, 30, 31, 32, 33, 34, respectively. Sprockets 27, 29, 31 and 33 engage the chain belt 15 so as to be driven thereby. Accordingly, these sprockets drive sprockets 28, 30, 32 and 34 through the idler shafts 23, 24, 25 and 26, respectively.

Chain belt 16 consists of three sections. A right-hand section 35, a mid-section 36 and a left-hand section 37. Sprockets 19 and 28 drive right-hand section 35, sprockets 30 and 32 drive the mid-section 36, and sprocket 34 together with the idler wheel (not shown) at the other end of the left-hand section 37 drive section 37. It will be seen that the principal driving means for the conveyor track is chain belt 15 and that its actuation is controlled by operation of fluid motor 22. The linear speed of all sections of the belts are the same.

Roller supports 38, 39 are disposed between sections 35 and 36 and between sections 36 and 37, respectively. These roller supports are mounted upon arms 40, 41 respectively, of a lift 42. The arms 40 and 41 are interconnected by a beam 43 at their free end. It will be observed that when the lift is in its downward position as shown in Fig. 1, the arms 40 and 41 terminate short of chain belt 15 and fit between sections 35 and 36 and sections 36 and 37, respectively, so that the roller supports are on about the same level as the upper surfaces of sections 35, 36 and 37 of chain belt 16. The arms thereby fit within discontinuities in chain belt 16, their roller supports tending to support a bin that passes over the arms.

A frame 44 rises from the floor and supports a pair of bearings 45, 46 which receive a central shaft 47. The arms 40 and 41 are pinned to shaft 47 so that rotation of the shaft will rotate the lift so as to raise and tilt a bin that rests on the arms.

At the right-hand end of shaft 47 in Fig. 1, and on the opposite side of bearing 46 from the arm 40, there is a sector gear 48 pinned to the shaft. This sector gear, which has teeth for the purpose, receives a chain 49 (see Fig. 2). Chain 49 is in two sections 50, 51 which are joined by a 90° twist block 52. The twist block is attached to each of the chain sections, section 50 engaging the sector gear, and section 51 wrapping around the under side of a pinion gear 53, which itself is mounted to a journal 54 on frame 44.

The free end of chain section 51 is attached to a piston rod 55. This piston rod forms one part of a fluid motor 56. This motor comprises a cylinder 57 that encloses a shiftable piston (not shown), which piston is mounted to rod 55 so that shifting of the piston will shift the rod. The cylinder is anchored to a support 58 that is itself attached to the frame. The cylinder has a pair of ports 59, 60, port 59 connecting to a reservoir 61 which is preferably disposed in an elevation above the cylinder for a reason to be disclosed below. Inlet 60 is connected to a control circuit to be described below.

To the opposite end of shaft 47 from the end to which the sector gear is mounted, there is pinned a cam 62. This cam has a generally low contour over most of its circumference and a rise 63 which is adapted to engage a switch to be described hereafter, during the period in which the fork lift is more than about half way up.

The control system of this device will now be described. It will be understood that it is desired to provide for substantially intermittent operation of the two fluid motors; that is, it is desirable that motor 22 which drives the track not be in operation during the time that the lift is elevated, and it is desired to have the track in operation when the lift is down. The scheme of operation of this device is that the conveyor track will be moved by motor 22 to deposit a bin squarely astride the lift 42. With a loaded bin squarely on the lift, the lift begins to elevate and tilt the bin, and at the same time the track stops. After the bin has been lifted and tilted so as to dump out its contents, the lift lowers it to the tracks at which time motor 22 operates the conveyor track to remove the empty bin from the lift and replace it with a full bin, after which the cycle is repeated.

As an optional but preferred feature of the scheme, it is desired to have the angular rate of motion of the lift proceed more rapidly as the lift initially rises from the track and then slow down after the lift has been tilted by some predetermined amount.

To carry out the above scheme, the control system 64 shown in Fig. 1, is provided. For convenience, hydraulic fluid motors have been provided, but it will be understood that this is merely the presently preferred and apparently most convenient form of power. Other forms of power could be used instead. The hydraulic system commences at a reservoir 65 from which fluid is drawn by pump 66 and supplied to a valve array through a manifold 67.

A first solenoid valve 68 (hereinafter called "track drive valve"), and a second solenoid valve 69 (hereinafter called "lift valve"), are connected to manifold 67. The other side of valve 68 is connected via conduit 70 to one port 71 of fluid motor 22. The other port 72 of motor 22 is connected via exhaust conduit 73 to reservoir.

The other side of valve 69 is connected to a manifold 74 which connects to a third solenoid valve 75 (hereinafter called "rate valve") and to a manually adjustable throttle valve 76. The other side of valves 75 and 76 are connected to a manifold 77 which connects to inlet 60 of fluid motor 56. A fourth solenoid valve 78 (hereinafter called "drain valve") is connected to manifold 77 and to an exhaust conduit 79.

A typical solenoid valve is shown in Fig. 4. Fig. 4 illustrates valve 68. In the example shown, the solenoid valve is spring-loaded "off," so that unless the solenoid is actuated, fluid will not flow therethrough. The hydraulic-control portion of valve 68 includes a cylindrical sleeve 80 that has an interior spool passage 81. A port 82 passes through the sleeve and intersects passage 81. A second port 83 pierces the sleeve at a position axially spaced from port 82.

Within passage 81 there is slidedly fitted a spool 84, the spool having a circumferential groove 85 lying between a pair of lands 86, 87. The groove is wide enough that it remains in communication with port 83 regardless of the axial position of the spool in the sleeve.

In the unactuated position illustrated in Fig. 4, land 86 covers port 82 so that flow through the valve is shut off. When the valve is actuated, the spool is drawn to the left so that ports 82 and 83 are connected via groove 85, land 86 having been moved to the left. A spring 88 spring-loads the spool toward an interior shoulder 89 that limits the distance which the spool can move to the right in Fig. 4, while a second shoulder 90 and spring 88 limit movement of the spool to the left.

A core 91 is attached to the spool and projects into a solenoid winding 92. The winding has a pair of leads 93, 94 and passage of current through the winding actuates the valve by causing the core 91 to attempt to centralize itself in the winding, thereby moving the core and the attached spool to the left in Fig. 4, which opens up the valve.

It will be seen that the above structure comprehends a valve which is open to hydraulic flow in its energized state. It will also be recognized that the arrangement could have been reversed so that the valve would be open when unactuated by providing a port 82a (shown in dotted line in Fig. 4). Port 82a (port 82 being plugged or not provided) is open to flow from port 83 in the illustrated non-actuated position. Actuation moves land 87 to close port 82a. It is a feature of the valve in either arrangement that it has two electrical conditions (actuated or non-actuated) to which there corresponds a hydraulic condition ("on" or "off") for each of the electrical conditions. Which conditions go together is merely a matter of choice.

There are four sequencing switches in this device. The first switch 100 (hereinafter called "lift rise switch") which is mounted adjacent to chain belt 16 and arm 41, switch 101 (hereinafter called "rate switch") which is mounted adjacent to cam 62, switch 102 (hereinafter called "lift down switch") and switch 103 (hereinafter called "track switch"). Switch 102 is disposed so it will be contacted by sector gear 48 when the gear is moved clockwise by chain 49 to the maximum degree desired for tilting the bin to dump the contents therefrom.

Switch 103 is mounted so as to be contacted by arm 40 when the arm and lift are in their lowermost position.

The connections between the switches and the solenoid valves will now be described. Switch 100 is a cam-actuated type device which is adapted to swing in a horizontal plane around a vertical axis, both clockwise and counter-clockwise. It is of the type in which the switch is closed when its actuator moves in one direction, but not in the other. Such switches are well known in the switching art and require no further description here.

Switch 100 has an arm 104 with a roller 105 at its free end. This roller is adapted to contact a bin, and when a bin rides along the left-hand section 37 of chain belt 16, the arm 104 will be displaced counter-clockwise, and the switch will be open. Solenoid valve 69 will be closed. When the bin has moved past the arm and moved squarely atop the lift, the arm 104 (which is spring-loaded for the purpose) moves clockwise, actuating the switch during the period it moves clockwise. The switch does not remain closed, but instead it is closed only during a short period of time during this motion. As stated before, when the switch is moved counter-clockwise by the next bin, the switch is not closed because it is designed to close only while moving one direction. While the switch is closed during the clockwise movement of arm 104, the bin condition is that there is a bin on the lift and that it is time for the lift to raise the bin to dump the same. Current is conducted by the switch from bus 106 to lead 107, which lead connects to a first winding 108 of a relay 109. The other end of winding 108 is connected to ground 110. Eneregizing winding 108 draws a switch arm 111 to touch a first contact 112, which thereby interconnects a battery 113 (or other voltage source) to the winding of solenoid 114, thereby actuating and opening valve 69. The other winding 115 of relay 109 is connected between ground 110 and lead 116. Lead 116 is in turn connected to one terminal of switch 102. The other terminal lead of switch 102 is connected to the bus.

It will be observed that relay 109 need have either of its windings actuated only momentarily, in order to swing its switch arm 111 between one or the other of its two contacts, and that this relay will therefore retain the solenoid in an actuated or non-actuated condition until the condition of the relay itself is changed.

Another similar relay 118 is provided for the control of solenoid valve 78. Relay 118 includes windings 119 and 120. Winding 119 is connected between ground 110 and lead 116, while winding 120 is connected between ground and a lead 121, which lead connects to one terminal of switch 103, while the other terminal of switch 103 is connected to the bus. It will be observed that lead 121 also connects with lead 92, lead 92 being one of the leads controlling solenoid valve 68, the other lead 93 of solenoid valve 68 being connected to ground.

Relay 118 has a pair of contacts, a live contact 122, and a dead contact 122a, which contacts are selected by a switch arm 124 that is controlled by windings 119 and 120. Contact 122 is connected by lead 123 to solenoid valve 78. The other side of solenoid valve 78 is connected by lead 125 to a source of voltage that has its other side connected to switch arm 124. Solenoid valve 78 is open when non-actuated, and closed when actuated.

Solenoid valve 75 is connected by lead 126 to ground and through a lead 127 to switch 101. Solenoid valve 75 is open when non-actuated, and closed when actuated.

The operation of this device will be described with initial reference to Fig. 1. Fig. 1 illustrates the condition which pertains when the lift is down and a bin is about to be moved onto it. At this time switch 103 is closed, because arm 40 makes contact with it in its "down" position. This closure of switch 103 allows current to flow through lead 121 and thereby actuates solenoid valve 68 so as to open the same. With pump 66 in operation, hydraulic fluid is thereupon supplied through conduit 70 to hydraulic motor 22 which thereby operates the conveyor track. Exhaust fluid from motor 22 flows through conduit 73 to reservoir.

The above operation will continue while a bin (not shown) is moved onto the lift means, because arm 104 of switch 100 will be held counter-clockwise and switch 100 will be open. As soon as the bin passes beyond arm 104, the arm snaps back in a clockwise motion, and momentarily switch 100 is closed. This passes current through lead 107 to winding 108, which draws switch arm 111 onto contact 112 so as to actuate solenoid 114. This will open solenoid valve 69 and supply hydraulic fluid to manifold 74 for operating the fluid motor 56. Solenoid valve 75 is spring-loaded to an open position when non-actuated, so that fluid flows from manifold 74 through solenoid valve 75 and throttle valve 76 to manifold 77 and thence to inlet 60 of fluid motor 56, which pulls rod 55 to the left in Fig. 1, thereby raising the lift. Raising the lift opens switch 103, and this cuts off the current to lead 121, thereby deenergizing solenoid valve 68, which cuts off the flow of fluid to conduit 70 and fluid motor 22. This stops operation of the track while the lift is in operation.

As the lift is initially in operation in the lower part of its arcuate motion, fluid passed by solenoid valve 69 flows through both solenoid valve 75 and throttle valve 76. After the lift means is part way up, rise 63 on cam 62 contacts and closes switch 101. This passes current from the bus to lead 127, which current actuates solenoid valve 75 so as to close the same. At this time, the only remaining flow to fluid motor 56 is through the throttle valve 76 and further raising of the lift means will therefore proceed at a reduced rate which can be determined by adjusting the orifice in the throttle valve.

As soon as the lift means has fully tilted the bin, the sector gear will come in contact with switch 102, which switch will pass current to lead 116. Current in lead 116 energizes winding 115 of relay 109 and swings switch arm 111 to make contact with the dead contact 117, thereby de-energizing the solenoid valve 69 and cutting off power to fluid motor 56. Current in lead 116 is also conveyed to winding 119 of relay 118, which moves switch arm 124 to dead contact 122a, thereby de-energizing solenoid valve 78 which opens the same, and permits fluid to flow from manifold 77 into exhaust conduit 79 to reservoir. Pressure for this reverse flow is caused by the weight of the lift operating through its chain against the piston rod to move the same to the right, thereby forcing the fluid from the cylinder back into manifold 77. Reservoir 61 operates as a surge chamber for the left-hand portion of the cylinder.

In the condition just described, the lift will drop down until it again contacts switch 103. Switch 103, when closed, passes current to lead 121 which again energizes solenoid valve 68 to operate fluid motor 22 and also passes current to energize winding 120 to draw switch arm 124 over onto live contact 122 so as to energize solenoid valve 78, thereby closing the same, so as to cut off flow therethrough. The cycle may now be indefinitely repeated. In the condition last described, a bin will be moved by the track onto the lift and the cycle will then be repeated time after time. The track will also remove the emptied bin from the lift.

It will be evident to persons skilled in the art that the "on" or "off" positions of the various relays, and the "open-closed" and "on-off" positions of the solenoid valves may be selected as desired, it being only necessary that the various solenoid valves, and their actuating devices, have unique conditions responsive to the operations desired.

It will also be recognized by persons skilled in the art that the various switches, which are shown as actuated by contact with elements of the structure and/or the bins, and as non-actuated when out of contact, could as well have been reversed so as to be actuated by lack of said contact, by merely loading the switches on when non-actuated, instead of off when non-actuated. The scheme is that the switch conditions are changed by movements of the mechanism and/or bins, and this change in position is caused by contact, either positive (a push on a switch to change a switch condition) or negative (a release of a switch to change a switch condition). The choice is merely one of design.

This invention is not to be limited by the embodiment shown in the drawing and described in the description, which is given by way of example and not of limitation, but only in accordance with the scope of the appended claim.

We claim:

1. A bin dumper comprising: a conveyor track adapted to carry a bin in a lateral direction; a first motor engaged to said track for driving the same; a lift adapted to dump a bin by lifting the bin from the track; tilting it, and then returning the bin to the track; a hydraulic motor engaged to the lift for operating the same to dump the bin; a source of pressurized fluid for operating the hydraulic motor; and control means connected to said motors adapted to control the application of actuating power thereto, said control means including a track switch that has a first condition and a second condition, said track switch being so disposed and arranged as to be contactable by structure movable with the lift and to be placed thereby in its first condition when the lift is in its lowered position, and to be placed in its second condition when the lift is in a position other than its lowered position, said track switch being connected to the first motor so as to permit actuating power to be applied thereto to drive the track when in its first condition, but not in its second condition, a lift-rise switch adjacent the track and so disposed and arranged as to contact a bin on the track, said lift-rise switch having a first condition and a second condition, and assuming its first condition for a limited time when a bin has just been moved onto the lift by the track just prior to which the bin was in contact with the lift-rise switch, and its second condition at all other times, said lift-rise switch in its first condition permitting power to be applied to the hydraulic motor to raise the lift, a lift-down switch so disposed and arranged as to be contactable by structure movable with the lift, and having a first condition and a second condition, and assuming its first condition by contact with the lift when the lift is in its uppermost position, and its second condition at all other times, said lift-down switch preventing further rise of the lift by stopping the flow of lifting power to the hydraulic motor and enabling the lift to lower the bin to the track, a rate switch so disposed and arranged as to be contactable by structure movable with the lift and having a first condition and a second condition, and assuming its first condition when the lift is above some medial position in its rise, and its second condition when the lift is below said medial position, the rate switch permitting the lift a faster rate of rise in the second condition than in the first condition, a lift valve, a rate valve and a drain valve, an actuator for each of said valves which is responsive to at least one of said switches and capable of placing the respective valve in either a flow or a no-flow condition, and an adjustable throttle valve, the lift valve being connected between said source of pressurized fluid and one side of the rate valve and of the adjustable throttle valve, the other side of the rate valve and of the throttle valve being connected to said hydraulic motor and to one said of the drain valve, the other side of the drain valve discharging to sump; a voltage source for the switches; the track switch being connected between the voltage source and the drain valve actuator in addition to its connection to the first motor; the lift-rise switch being connected between the voltage source and the lift valve actuator; the rate switch being connected between the voltage source and the rate valve actuator; the lift-down switch being connected between the voltage source and the lift valve actuator and between the voltage source and the drain valve actuator, whereby placing the lift rise switch in its first condition causes the lift valve actuator to move the lift valve to its flow position so as to permit hydraulic fluid to pass to the hydraulic motor to raise the lift, thereby shifting the track switch to its second condition and stopping the track, the drain valve being in its no-flow condition, and the rate valve in its flow condition, raising the lift to said medial position and moving the rate switch to its first condition, thereby actuating the rate valve actuator to shift the rate valve to its no-flow condition, raising the lift to its uppermost position and shifting the lift-down switch to its first condition, thereby shifting the drain valve to its flow condition and the lift valve to its no-flow condition, thereby enabling the hydraulic motor to reverse and lower the lift, arrival of the lift at the track shifting the track switch to its first condition, shifting the drain valve to its no-flow condition, and actuating the first motor to move the dumped bin off the lift, and a new bin onto the lift, the lift-rise switch remaining in its second condition until a bin is just placed on the lift, at which time it assumes its first condition for a period of time sufficient to restart the cycle.

2. Apparatus according to claim 1 in which the lift comprises a fork, and in which the conveyor track has two chains, a first continuous chain, and a second discontinuous chain, the fork being adapted to fit into the discontinuities in the second chain.

3. Apparatus according to claim 1 in which all of the valves are solenoid valves, the means for actuating said valves being solenoids, and the lift valve and drain valves including additional means comprising relays.

4. Apparatus according to claim 3 in which the lift-rise switch is a single-acting pivoted switch which is actuated in only one direction of its movement.

5. Apparatus according to claim 3 in which the first motor means is a rotary hydraulic motor, and in which the second motor means is a piston-cylinder hydraulic motor adapted to reciprocate, the said second motor means including a piston rod, and a chain, a shaft mounting the lift and having a gear engaged by the chain for operating the lift.

6. Apparatus according to claim 5 in which cam means are attached to the lift for controlling the rate switch.

7. Apparatus according to claim 6 in which the lift comprises a fork, and in which the conveyor track has two chains, a first continuous chain, and a second discontinuous chain, the fork being adapted to fit into the discontinuities in the second chain.

References Cited in the file of this patent

UNITED STATES PATENTS 1,295,195        Parker _____ Feb. 25, 1919